United States Patent
Butler

[11] 3,735,726
[45] May 29, 1973

[54] AUTOMATIC BREADING MACHINE

[76] Inventor: William Butler, 954 Hoe Avenue, New York, N.Y. 10459

[22] Filed: Aug. 18, 1971

[21] Appl. No.: 172,636

[52] U.S. Cl. .................. 118/24, 118/20, 118/309, 118/320, 118/502
[51] Int. Cl. ............................................. A23g 3/20
[58] Field of Search .................. 118/24, 309, 320, 118/316, 310, 311, 502, 20

[56] References Cited

UNITED STATES PATENTS

| 371,651 | 10/1887 | Wild | 118/309 |
|---|---|---|---|
| 1,068,733 | 7/1913 | Bradley | 118/309 |
| 1,104,471 | 7/1914 | Bradley | 118/309 |
| 1,883,535 | 10/1932 | Burnett | 118/309 |
| 2,695,595 | 11/1954 | Hagerman | 118/502 |
| 3,036,533 | 5/1962 | Burt et al. | 118/24 X |
| 3,291,630 | 12/1966 | Deyle et al. | 118/316 X |

FOREIGN PATENTS OR APPLICATIONS

| 587,278 | 4/1947 | Great Britain | 118/309 |

Primary Examiner—John P. McIntosh
Attorney—Sydney B. Schlessel

[57] ABSTRACT

A machine for breading or coating food articles with comminuted material prior to baking or frying, which comprises a transparent, substantially rounded housing divided into a main chamber and blower chamber. The main chamber has a plurality of pairs of spaced opposing spits, rotatably attached medially to the chamber walls, on which the articles are affixed, and a hopper for the breading material disposed above the chamber to discharge the material into the chamber in several directions. A fan blower is disposed at one end of the chamber to creat air currents therethrough at one level and a connecting duct opening into the other end of the chamber at a different level to create air currents in the chamber from the opposite direction, causing the discharging breading material to impinge against and adhere to the surfaces of the food articles as they are caused to rotate. A crumb tray at the bottom of the chamber receives the excess breading material. As a modification fan blowers are provided at each end of the chamber.

4 Claims, 3 Drawing Figures

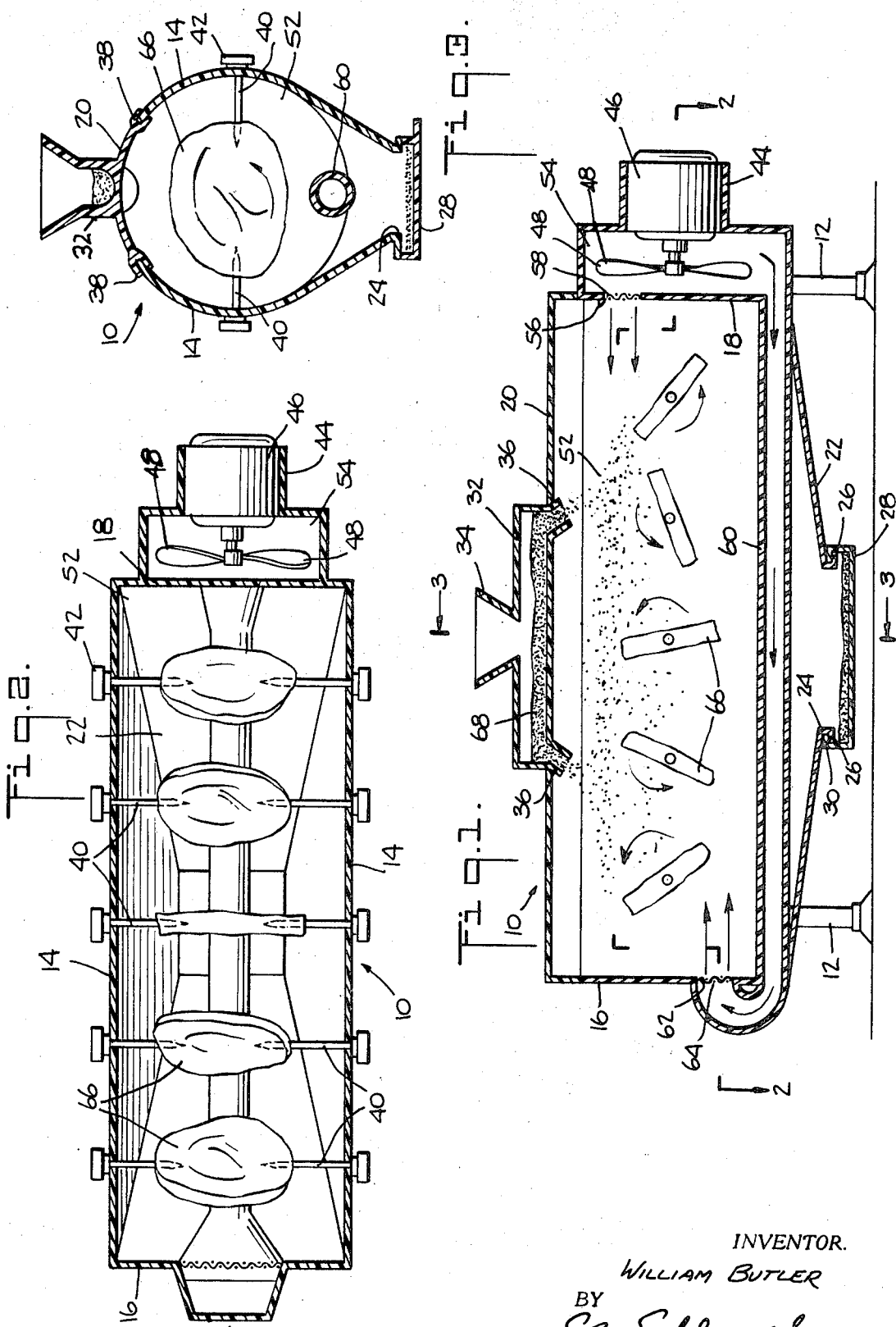

AUTOMATIC BREADING MACHINE

BACKGROUND OF THE INVENTION

1. Field of the Invention

This invention relates generally to the field of food processing and more particularly to the coating or breading of portions or sections of raw meat, fish and poultry, such as chops, fillets and the like, with flour, bread crumbs or similar comminuted materials, prior to baking or frying said portions, and has for its particular objective the provision of a machine to automatically coat the articles with such particles prior to baking or frying them.

2. Prior Art

In the present state of the art food articles such as are above described are generally breaded manually by pressing the food articles individually against the breading material disposed in a dish or pan, or by enclosing the article in a plastic bag containing the breading material and shaking the bag until the article is so coated. Such processes are time and labor consuming and are frequently messy. Several machines have heretofore been developed to perform this operation automatically, but these machines have generally been complicated and expensive. Some of such machines provide for the deposit of the breading material upon the top and bottom surfaces of the food articles as they are passed along a conveyor belt (see U.S. Pat. Nos. 2,845,040; 2,855,893; 3,045,640; and 3,547,075). Another type of machine employs the use of a rotating drum in which the food article to be breaded is secured to a central spit, and as it is rotated the breading material resting at the bottom of the drum is lifted up by the movement to fall against the article (see U.S. Pat. No. 2,897,776). In addition to being complicated, such a machine is generally limited to treatment of a single article at a time, and consequently is time-consuming. Nowhere in the prior art is there found any machine or device which employs air pressure to coat or bread the food article.

BRIEF SUMMARY OF THE INVENTION

My invention employs the use of air pressure and agitation within a housing to bread or coat the food articles, and for such purpose employs a housing wherein a plurality of food articles are suspended on spaced rotatable spits within the housing and below a hopper from which the comminuted material or bread crumbs discharges into the housing while air is forced across the housing from its ends on different levels, causing the entering crumbs to impinge against and adhere to the sides of the food articles while the latter, by the action of the opposing air currents at different levels, are caused to rotate, until the articles are properly coated.

The principal object of my invention, therefore, is to provide an automatic food coating machine whereby the articles are mounted on rotatable spits within the machine, and are rotated by divers forces of air generated from each side of the machine, the breading material being simultaneously discharged into the machine in proximity to the articles and imbedded into the sides of the articles by the force of the generated winds to coat the latter.

A second important object of my invention lies in the provision of a machine of the type described whereby a plurality of food articles may be breaded at the same time.

A third important object of my invention lies in the provision of a breading machine of the type described wherein the breading process is visible to the operator and thereby controlled.

A fourth important object of my invention lies in the provision of a breading machine of the time described which is provided with means to recover the excess breading material for future use.

Still another important object of my invention lies in the provision of a breading machine which is inexpensive to manufacture and simple to use.

These and other salient objects, advantages and functional features of my invention, together with the novel features of construction, composition and arrangement of parts, will become more readily apparent from an examination of the following specification, taken with the accompanying drawings, wherein:

DRAWING DESCRIPTION

FIG. 1 is a side, cross-sectional view of a preferred embodiment of my invention;

FIG. 2 is a cross-sectional view, taken on lines 2—2 of FIG. 1; and

FIG. 3 is a cross-sectional view, taken on lines 3—3 of FIG. 1.

Similar references characters designate similar parts throughout the different views.

DETAILED DESCRIPTION OF THE INVENTION

Illustrative of the preferred embodiment, there is shown a housing 10 mounted on supports 12. The housing 10 comprises side walls 14 substantially semicircular in cross-section and tapering downwardly, end walls 16 and 18, a cover 20 and a floor 22. The floor 22 slopes downwardly towards its center, which is provided with an opening 24 whose front and rear edges are turned outwardly to form channels 26. A crumb tray 28 provided with inwardly turned flanges 30 on either side is slidably mounted on the floor 22 by the engagement of the flanges 30 within the channels 26, to enclose the opening 24. The cover 20 is provided with an integral hopper 32 having a funnel 34 and discharge spouts 36 opening into the housing 10, with the side edges of the cover 22 bifurcated to form channels 38 adapted to seat around the upper edges of the side walls 14, thereby permitting the cover 20 to be slid longitudinally to expose the interior of the housing 10. A series of pairs of spaced, opposing spits 40 are secured through the side walls 14 and are freely rotatable within the main chamber 52 of the housing 10, as well as manually rotatable by operation of the knobs 42.

The end wall 18 is extended to form a fan chamber 54 which is provided with a reduced, extended annular mounting 44 to support an electric fan blower 46 having its fan blades 48 disposed within the fan chamber 54, as shown. The fan blower 46 is activated by a switch (not shown), and suitably connected to an electric source (not shown).

The wall 18 is provided with an opening 56 in its upper portion disposed to afford communication between the fan blades 48 and the main chamber 52, and is covered by a mesh screen 58. The lower portion of the fan chamber 54 opens into an air duct 60 which traverses the body of the chamber 52 adjacent its floor 22, and extends beyond the housing 10 to open into the lower portion of the end wall 16, and communicates with the interior of the chamber 52 through an opening 64 in the lower portion of the end wall 16, and is similarly protected by a mesh screen 66.

In the construction of my breading machine the housing 10, including the duct 60, is preferably constructed of a rigid transparent plastic material, although other suitable material may be substituted therefore, while the spits 40 are preferably of metal, such as stainless steel and the like.

OPERATION OF THE INVENTION

In the operation of my invention, the cover 20 is slid back to expose the interior of the chamber 52, and an article of food 66, such as a steak, chop, fillet or piece of fowl, is secured to each pair of spits 40, the cover 20 then being closed. The fan blower 46 is then activated, causing the air in the chamber 52 to be blown against the articles 66 in different directions at different levels (as shown by the arrows in FIG. 1), whereby the wind force causes the articles 66 to rotate on the respective spits 40. At the same time breading material 68 is poured into the hopper 32, from which it discharges into the chamber 52 on either side of the articles 68. The air currents and winds created, as above described, drive the particles of breading material 68 against the rotating articles 66, causing them to adhere to the latter, and thereby to facilitate the coating of all areas of the articles 66. Screens 58 and 64 prevent entry of breading material 68 into the duct 60 or chamber 54. Through the transparent walls 14 of the housing 10 the operator may observe the coating process and, when all of the articles 66 have been properly coated, deactivate the machine, slide back the cover 20 and remove the articles 66. The excess breading or coating material 66 remaining in the chamber 52 drops to the floor 22 and thence into the tray 28, from which they may be removed for re-use. The machine is then ready for the next set or batch of food articles to be breaded, for repetition of the operation.

In the embodiment disclosed and described the air currents are provided in both directions by the combination of the fan blower 46 and connecting duct 60. It is, however, clearly apparent that a second fan blower 46 may be provided for the wall 16, instead of the connecting duct 60. It is also to be noted that the spits 40 are shown to be pointed, but that the invention is not limited to such structure alone, For example, the ends of the spits 40 may be serrated or ridged, to hold the food articles 66 more firmly, or they may even employ some standard locking structure, as is well known in the art.

From the foregoing, therefore, it is obvious that the embodiment shown and described is by way of illustration and not of limitation, and that various changes may be made in the construction, composition and arrangement of parts without limitation upon or departure from the spirit and scope of the invention, or sacrificing any of the advantages thereof inherent therein, all of which are claimed.

Having described my invention, I claim:

1. An automatic breading machine comprising a substantially cylindrical transparent housing formed by a circular side wall, end walls, a floor and a slidable cover adapted to selectively expose the interior of the housing, a plurality of spaced pairs of opposing spits rotatably secured medially in the side wall of the housing and adapted to support a plurality of food articles therein in suspended, spaced relationship to each other, a hopper integral with the cover and provided with spouts opening into the housing in proximity to the food articles and adapted to discharge comminuted material into the housing in proximity to the food articles, a fan chamber integral with one end wall of the housing, a fan blower disposed within the fan chamber, an opening in said end wall affording communication between the fan chamber and the interior of the housing, an air duct communicating with said fan chamber and extending transverse the housing adjacent the floor thereof, and an opening in the other end wall of the housing at a different level from the opening in the first end wall and communicating with the abutting end of the transverse air duct, whereby air currents from the fan blower are directed against the food articles from opposite directions and at different levels simultaneously with the discharge of the comminuted material into the housing.

2. An automatic breading machine as described in claim 1, the floor of the housing sloping toward its center and provided with a central opening having outwardly turned opposing edges to define a pair of parallel channels, and a crumb tray provided with a pair of inwardly turned flanges adapted to engage the opening channels to slidably support the tray below the opening.

3. An automatic breading machine as described in claim 1, the openings in the end walls of the housing being provided with mesh screens to prevent exit of comminuted material therethrough.

4. An automatic breading machine as described in claim 1, the rotatable spits being provided at their free ends with means to engage and hold the food articles in suspension.

* * * * *